J. A. OWENS.
ROACH HIVE OR TRAP.
APPLICATION FILED MAY 22, 1916.
1,243,625.
Patented Oct. 16, 1917.
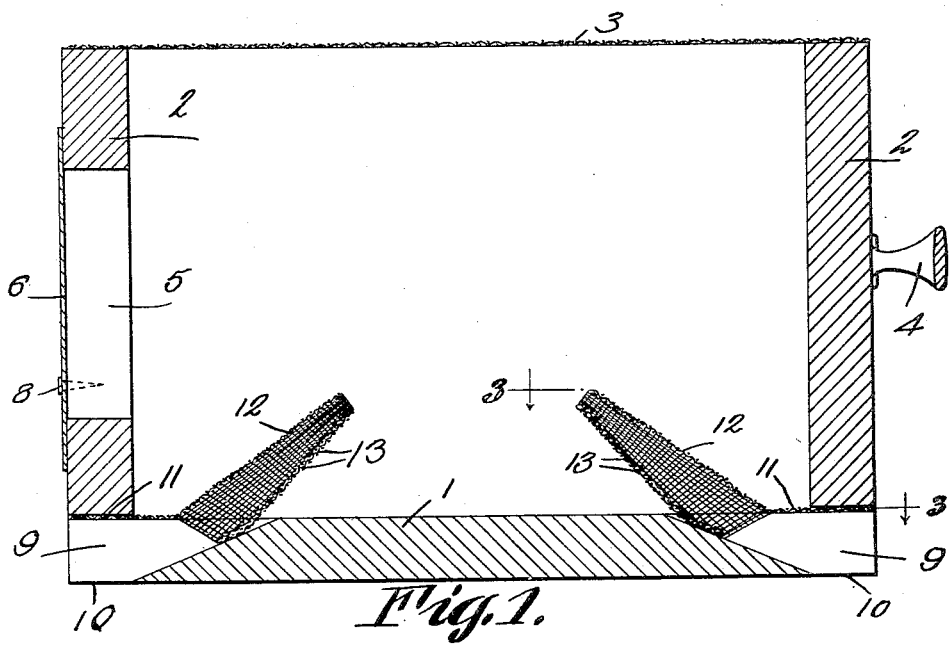
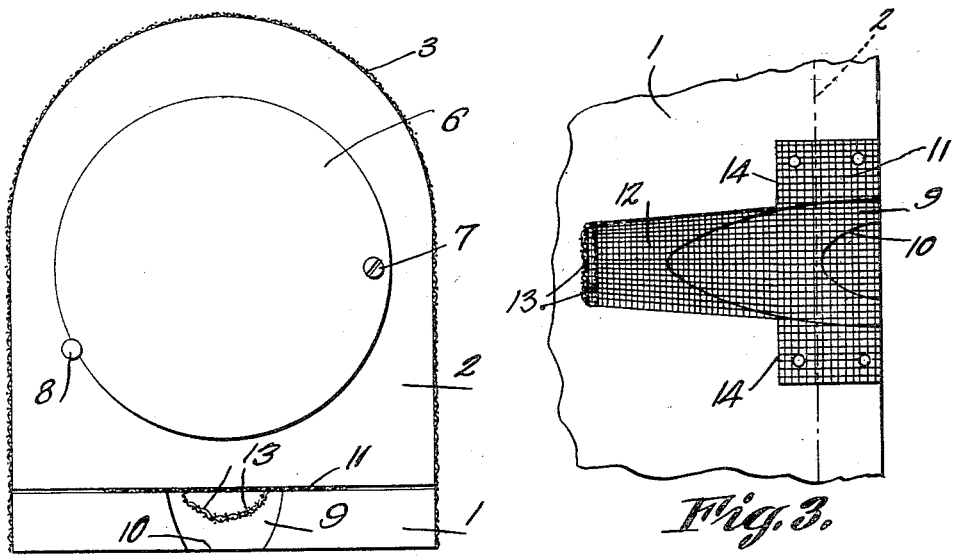
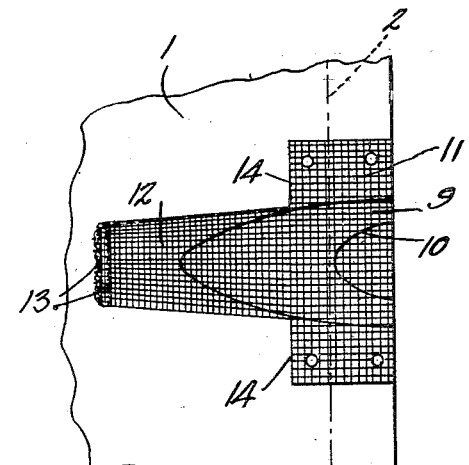
John A. Owens, Inventor
by C. A. Snow & Co., Attorneys

UNITED STATES PATENT OFFICE.

JOHN ANTHONY OWENS, OF MOULTRIE, GEORGIA, ASSIGNOR TO CLAY L. DEAN, OF MOULTRIE, GEORGIA.

ROACH HIVE OR TRAP.

1,243,625.

Specification of Letters Patent.

Patented Oct. 16, 1917.

Application filed May 22, 1916. Serial No. 99,146.

*To all whom it may concern:*

Be it known that I, JOHN A. OWENS, a citizen of the United States, residing at Moultrie, in the county of Colquitt and State of Georgia, have invented a new and useful Roach Hive or Trap, of which the following is a specification.

The present invention relates generally to traps, and relates more especially to insect traps.

It is the object of the invention to provide a novel and improved, yet simple and inexpensive trap adapted especially for catching roaches and similar insects.

The invention also has for its object the provision of a trap having unique means for the entrance of the roaches or bugs into the captivity chamber, and precluding the escape of the bugs after they are caught.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a central vertical section of the trap or hive.

Fig. 2 is an end view thereof.

Fig. 3 is a detail view of one of the entrance leaders, this view being taken on the line 3—3 of Fig. 1.

In carrying out the invention, there is provided a casing embodying a rectangular bottom 1 constructed of wood, metal or other suitable material, and upstanding ends 2 secured in any suitable manner upon the ends of the bottom 1. The ends 2 of the casing can be constructed of wood, metal or other suitable material, and an arched reticulated or foraminous sheet 3 of wire mesh or other suitable material is secured in any suitable manner upon the ends 2, and to the side edges of the bottom 1, to complete the captivity chamber or compartment. The sheet 3 provides the sides and top of the casing, through which the roaches can be seen, and to enable the roaches to scent the bait of any suitable character which is placed upon the bottom 1 centrally thereof to attract the roaches.

A suitable handle 4 is attached to one end 2 of the casing and the opposite end is provided with a discharge opening 5 normally closed by a door 6 which is of circular outline, as illustrated in Fig. 2, said door 6 being pivotally supported at one side of the opening 5, as at 7, and the free portion of the door being supported by a nail, tack, or other keeper 8 carried by the end 2 at that side of the opening 5 opposite the pivot 7. The insects which are caught within the captivity chamber can be exterminated in any suitable manner, and by opening the door 6 and suspending the trap by means of the handle 4, the insects can be discharged from the trap, the trap being shaken by the handle 4 if desired. The opening 5 when uncovered, also permits the bait to be placed within the trap.

The trap is provided with an entrance leader at each end. Thus, each end of the bottom 1 is provided intermediate the side edges of said bottom with an inclined recess 9 extending from the end of the bottom to the upper surface thereof, and providing an inclined run way with a notch 10 at the lower end of the run way to expose the floor or other surface upon which the casing is set, whereby the roaches can readily enter the entrance from the floor to pass up the run way. The roaches in running around the trap upon the floor or other surface, will come to the recesses 9, which provide the entrances, and the roaches will naturally pass into the entrances, passing from the floor within the notches 10 up the run ways. The leaders proper project upwardly and inwardly from the upper ends of the run ways or the inner ends of the recesses 9. Each leader is formed from a sheet 11 of wire mesh or other reticulated material. The sheet 11 is nailed, tacked or otherwise secured upon the bottom 1 so as to extend across the outer end of the recess 9 underneath the respective end 2 which also extends across the recess 9, and said sheet 11 is provided with an inclined portion 12 extending from the inner end of the recess 9. This portion 12 is provided with wings 13 bent downwardly and inwardly into overlapping relation, to provide the inlet leader. Said leader is of tapered formation, and its larger entrance end fits within the inner end of the recess 9 to provide a continuation of the entrance, which projects in an inclined direction above the bottom 1. The free upper end of the leader is flattened, to provide a relatively flat outlet for the roaches to pass from the leaders into the captivity chamber. The lower ends of the wings 13 in bearing upon the upper end of the run way, will support the leader, and the roaches will readily pass from the run way up through the leader, and will drop from the upper ends of the leaders onto the bottom 1. The leaders in being of tapered form, and projecting in inclined directions within the captivity chamber, permit of the ready entrance of the roaches into the captivity chamber, but preclude the exit of the roaches. The leaders are each formed from a sheet 11 of wire screen or equivalent material, and such sheet is slit from its side edges, as at 14, between its ends, to provide the flat portion which is secured upon the bottom 1 across the outer end of the recess 9, and to provide the wings 13 of the portion 12 which are bent back into overlapping relation to complete the leader.

The present roach hive or trap has proven to be of unusual success, and importance is attached to the provision of the entrance recesses 9 extending to the margin of the bottom 1 and to the lower surface of said bottom in connection with the inclined leaders extending from the inner ends of said recesses, the recesses providing run ways extending to said leaders.

What is claimed as new is:

An insect trap comprising a casing having a bottom provided with an entrance recess extending into its margin and providing an inclined runway, and a sheet of reticulated material slit from its side edges between its ends, that portion of said sheet at one side of the slits being secured upon the bottom across said recess, the opposite portion of said sheet being inclined from the aforesaid portion thereof and having wings provided by said slits, said wings being bent back downwardly into overlapping relation to provide a leader, and said overlapped wings seating upon said runway.

In testimony that I claim the foregoing as my own, I have hereto affixed my signature in the presence of two witnesses.

JOHN ANTHONY OWENS.

Witnesses:
L. L. MOORE,
M. A. NESMITH.

Copies of this patent may be obtained for five cents each, by addressing the "Commissioner of Patents, Washington, D. C."